United States Patent
Iida

(10) Patent No.: US 6,707,953 B1
(45) Date of Patent: Mar. 16, 2004

(54) IMAGE PROCESSING APPARATUS INTERPOLATING THIN LINE INCLUDED IN INPUT IMAGE DATA

(75) Inventor: Kentaro Iida, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/347,276

(22) Filed: Jul. 6, 1999

(30) Foreign Application Priority Data

Jul. 14, 1998 (JP) .......................................... 10-198883

(51) Int. Cl.[7] ................................................. G06K 9/38
(52) U.S. Cl. ....................... 382/273; 382/258; 382/260; 382/300
(58) Field of Search ................................. 382/254, 258, 382/260, 273, 270, 256, 300, 263, 264

(56) References Cited

U.S. PATENT DOCUMENTS 5,289,373 A * 2/1994 Zarge et al. ................. 382/128
5,539,534 A   7/1996 Hino et al.
6,178,260 B1 * 1/2001 Li et al. ....................... 382/173
6,185,328 B1 * 2/2001 Shiau .......................... 382/173

FOREIGN PATENT DOCUMENTS

JP           07184043 A        7/1995

* cited by examiner

Primary Examiner—Thomas D. Lee
(74) Attorney, Agent, or Firm—Burns, Doane, Swecker & Mathis, L.L.P.

(57) ABSTRACT

In order to correct a thin line to be thin and dense and to prevent the thin line from becoming patchy after binarization of image data without specifying the thin line from image data, an image processing apparatus has the following features. Density peak degrees in four directions are detected by density peak detection filters for four directions, on each pixel. Among the detected density peak degrees of four directions, the maximum density peak degree is used as a degree of thinness of the pixel. For each pixel, the degree of thinness is multiplied by a weight coefficient, and a value obtained by adding the resulting value to the pixel density is used as the new pixel density.

18 Claims, 7 Drawing Sheets

SCOPE OF IMAGE PICK UP

FIG. 5A

| -1.33 | 0.33 | 2 | 0.33 | -1.33 |

DIRECTION 1

FIG. 5B

| -1.33 |
| 0.33 |
| 2 |
| 0.33 |
| -1.33 |

DIRECTION 2

DIRECTION 3

DIRECTION 4

DOUBLE ENLARGED
INTERPOLATED IMAGE

DEGREE OF THINNESS

SYNTHESIZED IMAGE

IMAGE PROCESSING APPARATUS INTERPOLATING THIN LINE INCLUDED IN INPUT IMAGE DATA

This application is based on Application No. 10-198883 filed in Japan on Jul. 14, 1998, the entire content of which is hereby incorporated by reference.

BACKGROUND OF THE INVENTION

1. Field of the Invention

The present invention relates to an image processing apparatus and, more particularly, to an image processing apparatus for processing image data obtained by picking up character information by a digital still camera or the like.

2. Description of the Related Art

A digital still camera in which information of an object picked up by an image pick up sensor such as a CCD (Charge Coupled Device) is converted to digital data has come to be widely used. It is possible to pick up or photograph as an object, a media, on which character information is printed, such as newspapers, a magazine or a presentation document, by the digital still camera. When the character information is picked up as an object, the character information itself in the object is small, and when the thus obtained image data is output directly to a printer or a display without any processing, it is difficult for a person to recognize the characters as the characters may be smudged or patchy. This is because the total number of pixels of the image pick up sensor is limited, and such degradation depends on the performance of the digital still camera.

Therefore, generally, the obtained image data is processed to interpolate the characters which are smudged or patchy. The processing includes enlarging and interpolating process, smoothing, and binarization. The enlarging and interpolating process is a method of enhancing density of pixels of the obtained image data, and cubic convolution interpolation and DCT-IDCT (Discrete Cosine Transform-Inverse DTC) are examples of this method. By the enlarging and interpolating process, characters in the image data are interpolated to be smooth. Smoothing is performed by detecting and correcting an edge portion from the image data. By the smoothing process, the characters in the image data are corrected to be sharper. Binarization is to binarize the character information.

When the character image formed on the image pick up sensor is compared with the output of the image pick up sensor, however, the output of the image pick up sensor of a thin line of which width is approximately equal to or smaller than the pixel of the image pick up sensor has lower density than the character image actually formed on the image pick up sensor.

When the width of the thin line is narrower than the width of the pixel of the image pick up sensor, for example, the thin line is detected as a line having the width of the pixel. Therefore, the output of the image pick up sensor comes to be wider and faded than the character image on the image pick up sensor. When the thin line of which width corresponds to the width of the pixel of the image pick up sensor is formed bridging between two pixels on the image pick up sensor, the thin line is on only half of each of the two pixels on which the thin line is formed, and therefore the output of each pixel is one half that when the same thin line is formed on one pixel of the image pick up sensor. As a result, the thin line recognized from the image pick up sensor outputs (of two pixels) has double the width and half the density of the original thin line.

The above described problem cannot be solved even when the obtained image data is subjected to enlarging and interpolating process, as the interpolation is performed on the line which is wider in width and lower in density than the actual line.

When the obtained image data or the data after enlargement and interpolation is to be binarized, a portion having the density lower than a threshold value is determined to have zero density, and as a result, the thin line becomes patchy, or partially missed.

Though the above described problem can be solved by smoothing in which an edge portion of the thin line is detected from the output of the image pick up sensor and corrected, the process of detecting the thin line is difficult and time consuming.

SUMMARY OF THE INVENTION

The present invention was made to solve the above described problems, and its object is to provide method and apparatus of image processing capable of interpolating a thin line to be dense while thin in width without the necessity of specifying the thin line from the image data, and capable of preventing, in a simple manner, the thin line after image data binarization from being patchy, as well as to provide a computer program product for processing an image.

In order to attain the above described objects, the present invention provides, according to an aspect, an image processing apparatus including detecting means for detecting, for each of a plurality of pixel data constituting image data, based on densities of a process object pixel data to be processed and peripheral pixel data positioned around the process object pixel data, density peak of said process object pixel data, and correcting means for correcting density of the process object pixel data, using the density peak detected by the detecting means.

According to another aspect, the present invention provides a method of image processing, including a first step of detecting density peak of process object pixel data, for each of a plurality of pixel data constituting image data, based on densities of the process object pixel data to be processed and peripheral pixel data positioned around the process object pixel data, and correcting density of the process object pixel data using the density peak detected in the first step.

According to a still further aspect, the present invention provides a computer program product on a recording medium executable by a computer for processing an image, the computer program product including detecting means for detecting, for each of a plurality of pixel data constituting an image data, based on densities of process object pixel data to be processed and peripheral pixel data positioned around the process object pixel data, density peak of the process object pixel data, and correcting means for correcting density of the process object pixel data, using the density peak detected by the detecting means.

According to these aspects of the present invention, the density peak is detected for every pixel data based on a pixel data and surrounding pixel data and the pixel data is corrected based on the density peak, and therefore method and apparatus for image processing, and a computer program product for image processing capable of interpolating a thin line to be dense and thin without the necessity of specifying the thin line among image data and capable of preventing patchy images after binarization of the image data can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5A to 5D are illustrations related to a density peak detecting filter.

DESCRIPTION OF THE PREFERRED EMBODIMENTS

Figure 1:
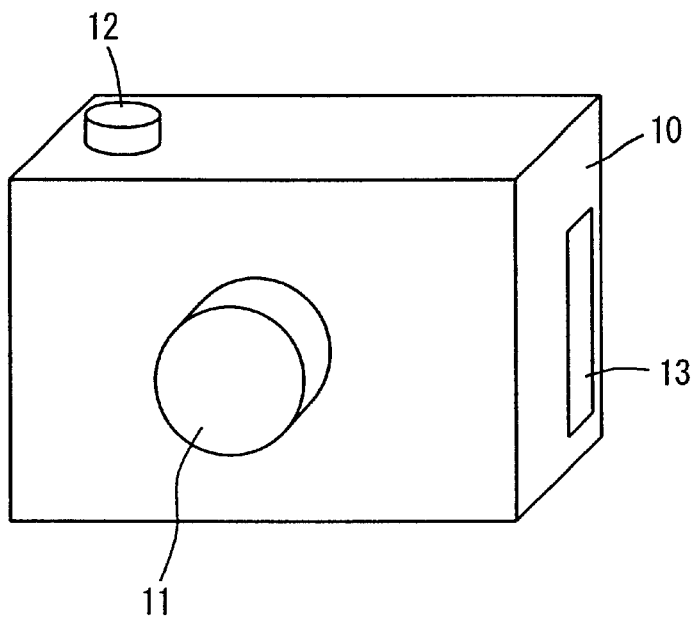
FIG. 1 is a perspective view representing an appearance of a digital still camera to which the image processing apparatus of the present invention is applied.
Figure 2:
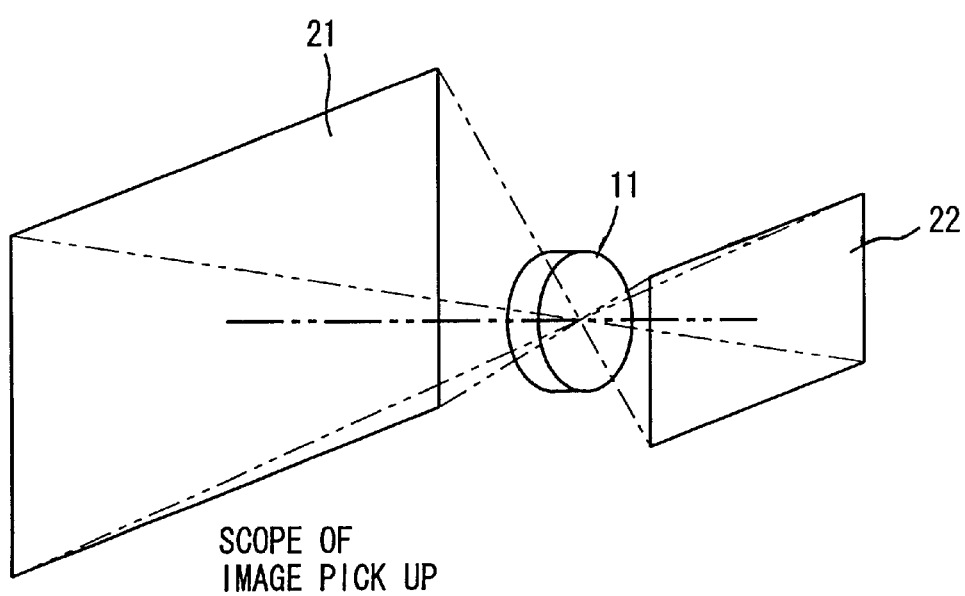
FIG. 2 is a schematic representation of an optical system of the digital still camera.

Referring to FIGS. 1 and 2, a digital still camera 10 includes a lens 11, a release switch 12 and an external storage device 13. An object within a scope 21 of image pick up has its image formed on an image pick up sensor 22 contained in the body of camera 10 through lens 11.

Image pick up sensor 22 is a CCD image sensor having photo electric converting units arranged in an array of m×n. Each photo electric converting unit corresponds to a pixel, and when release switch 12 is pressed, pixel data is output from the photo electric converting unit. Here, collection of the pixel data is referred to as image data. Though a CCD image sensor is used as the image pick up sensor in the present embodiment, any other image sensor such as a MOS (metal-oxide-semiconductor transistor), CID (charge injection device) and PCD (plasma coupled device) may be used, provided that the sensor converts an optical signal to an electric signal.

External storage device 13 may be a floppy disk drive or a CD-ROM drive.

Figure 3:
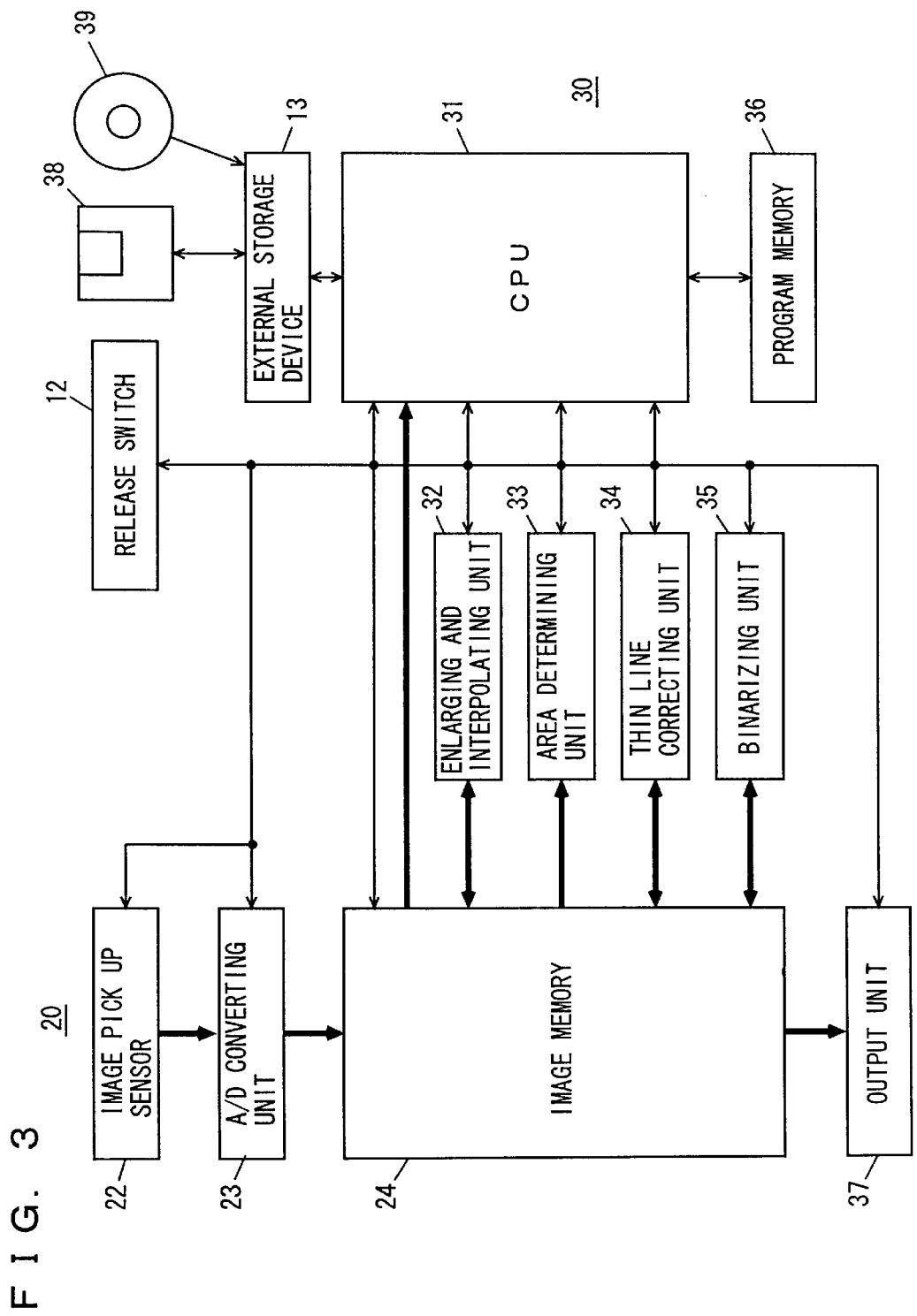
FIG. 3 is a schematic block diagram representing a configuration of the image processing apparatus.

Referring to FIG. 3, briefly, the image processing apparatus in accordance with the present embodiment may be divided into an image pick up unit 20 and an image processing unit 30. Image pick up unit 20 includes image pick up sensor 22, an A/D converting unit 23 and an image memory 24. When release switch 12 is pressed, an object image formed on image pick up sensor 22 is output as image data of analog signal to A/D converting unit 23. In response to pressing of release switch 12, A/D converting unit 23 converts the image data to digital signal, and transmits the digital signal to image memory 24. Image memory 24 is a random access memory (RAM), and the data stored therein is processed by image processing unit 30.

Image processing unit 30 includes a CPU (central processing unit) 31, an enlarging and interpolating unit 32, an area determining unit 33, a thin line correcting unit 34 and a binarizing unit 35. Image processing unit 30 performs various processings on the image data stored in image memory 24, of which details will be given later.

An output unit 37, a program memory 36 and external storage device 13 are additionally connected to CPU 31.

Output unit 37 is a display for displaying and outputting the image data stored in image memory 24. Output unit 37 may be a printer for printing the image data, or it may be an output terminal for externally outputting the image data to an external display or a printer.

Program memory 36 is a memory for storing a program which describes the process to be executed by image processing unit 30. CPU 31 performs image processing, by controlling various processing units connected to CPU 31 in accordance with the program stored in program memory 36.

External storage device 13 reads the image processing program stored in a floppy disk 38 or a CD-ROM 39, and stores the same in program memory 36 through CPU 31. It is also possible to read the image data stored in floppy disk 38, store the data in image memory 24 and perform the above described image processing thereon. Further, it is also possible to store the image data which has been stored in image memory 24 in floppy disk 38. Though a floppy disk drive or a CD-ROM drive has been described as external storage device 13, other device allowing reading or writing from and to a recording medium other than a floppy disk or a CD-ROM such as a magnetic disk, an IC card or a magneto-optical disk may be used.

In the present embodiment, though enlarging and interpolating unit 32, area determining unit 33, thin line correcting unit 34 and binary processing unit 35 have been described as processing units separate from CPU 31, the processes to be performed by these processing units may be described as a program and executed by CPU 31. In that case, these processing units 32 to 35 are unnecessary.

The image processing program may be stored in advance in an ROM in the digital still camera, or it may be stored in a recording medium such as a hard disk, a floppy disk, a CD, a magneto-optical disk or the like and read by the CPU.

Though the image processing program is described as being executed in digital still camera in the present embodiment, the image data may be transferred to a host computer and the program may be executed in the host computer.

The process flow which takes place in the image processing apparatus will be described with reference to FIG. 4.
[step S01]
A process of picking up an image of an object is performed in image pick up unit 20. When release switch 12 is pressed, information of the object image formed on image pick up sensor 22 is output as image data from image pick up sensor 22, which image data is converted to digital data at A/D converting unit 23 and stored in image memory 24.
[step S02]
Area determining unit 33 determines areas by attribute of the data contained in the image data, of the image data stored in image memory 24. In this determination, based on two-dimensional frequency distribution of the data, density distribution or edge intensity distribution, for example, of the image data, areas of respective attributes, that is, character, photo, dot and the like are determined. The character attribute means the attribute of such an image area that mainly comprises characters represented in two gradation. The photo attribute means the attribute of such an image area that is represented smoothly in half tone density. The dot attribute means the attribute of an image area that is represented by dots, such as a photograph on a newspaper. Areas occupied by data of respective attributes of the image data are extracted and transmitted together with the attributes, to CPU 31.

If it is known in advance that the image data consists of character attribute areas only, the area determining process of this step may be omitted.

[step S03]

On the area determined to be of character attribute in step S02, enlargement and interpolation is performed by enlarging and interpolating unit 32. This step is performed as sufficient resolution is not obtained because of the limit on total number of pixels of image pick up sensor 22 for characters and lines. The enlarging and interpolating process includes cubic convolution interpolation and DCT-IDCT method. In the present embodiment, double enlargement and interpolation is performed by cubic convolution interpolation. The enlarged and interpolated image data are stored in image memory 24.

[step S04]

The process for correcting thin lines of the image data is performed, which will be described later.

[step S05]

On an area having character attribute of the image data, the image data are binarized, using a prescribed threshold value as a reference. This is to reduce the data amount of the image data and to improve visual quality when the data are output.

[step S06]

Prescribed image processing on areas of attributes other than the character attribute is performed. For example, on an area of photo attribute, gradation correction is performed.

The thin line correcting process will be described in the following. When a thin line of which width is smaller than two pixels is enlarged and interpolated by cubic convolution interpolation, the density of pixels tends to be generally low and to have such a distribution that is a hill with the density peak at the central portion (the center of the line). The density of a thick line or of a solid black portion tends to be trapezoidal with density distribution existing at a peripheral portion. Based on such tendency, in the thin line correcting process, the portion of the hill-shaped density peak is detected, and densities of pixels are increased in accordance with the detected density peak. Through such process, the thin line can be kept thin with its density increased.

More specifically, density peak is detected pixel by pixel using a detection filter for detecting the density peak shown in FIGS. 5A to 5D. A value obtained by adding the detected density peak degree to the pixel density will be used as a new pixel density. FIG. 5A represents a density peak detection filter in the lateral direction, 5B represents the filter in longitudinal direction, and FIG. 5C and D are filters in two diagonal directions. Each density peak detecting filter has the width of one pixel and the length of five pixels, and the pixel of which density peak degree is to be detected is positioned on the central pixel of the filter. The filter is used in the following manner. When there are pixels 1 to 5 aligned side by side from left to light, and the filter of FIG. 5A is applied, the density peak degree of pixel 3 will be the value obtained through the following expression.

$$-1.33 \times (\text{pixel } 1) + 0.33 \times (\text{pixel } 2) + 2 \times (\text{pixel } 3) + 0.33 \times (\text{pixel } 4) - 1.33 \times (\text{pixel } 5)$$

The density peak detecting filter has coefficient arrangement point-symmetrical with respect to the central pixel. From the center to one side, the pixel distance and the coefficient are in a relation of linear function, and the sum of all coefficients is zero.

The length of the density peak detecting filter is defined to be five pixels, because when a thin line of which width is two pixels of the image pick up sensor 22 is subjected to double enlargement and interpolation by cubic convolution interpolation, the width is always smaller than 5 pixels. When the length of the density peak detecting filter is shorter than this, there would be much noise influence. Therefore, when n times interpolation is performed, the filter should have the length of 2n+1. When the enlarging and interpolating process is not performed, n=1.

Figure 6:
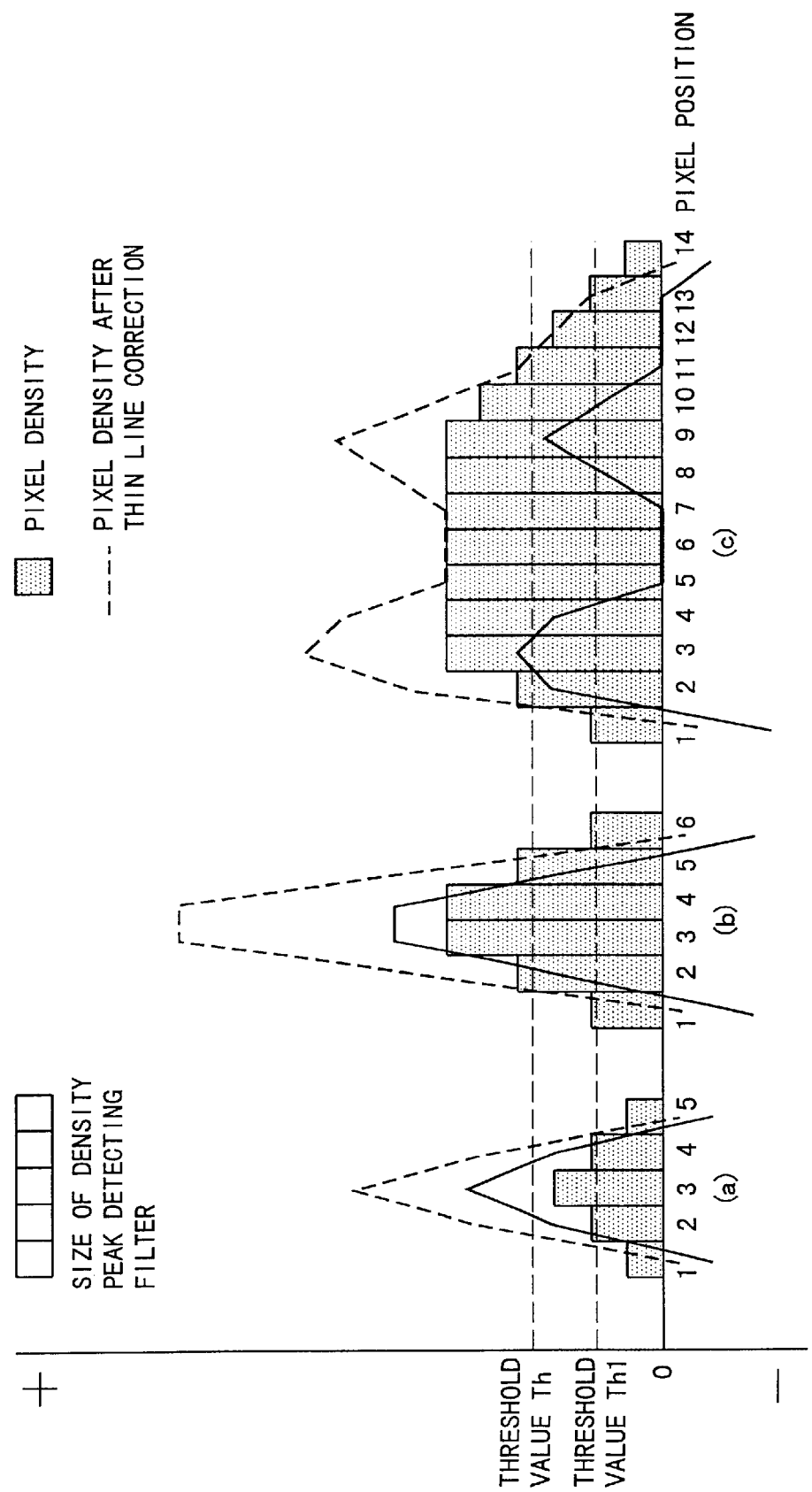
FIG. 6 is a graph representing the nature of the density peak detecting filter.

In FIG. 6, (*a*), (*b*) and (*c*) are cross sections when a thin line, a thick line and thicker line are enlarged and interpolated, respectively. The result of detection of the density peak degree using the density peak detecting filter in the lateral direction (direction 1) shown in FIG. 5A is given in a solid line, the pixel density is represented by bar graph, and the pixel density after thin line correcting process is represented by the dotted line.

For convenience of description, pixels aligned in the lateral direction are allotted with numbers and shown in FIG. 6. Referring to FIG. 6(*a*), every pixel has pixel density lower than the threshold value Th used for the binarization. As to the density peak degree, it is higher than the threshold value Th in pixel 3, while lower than the threshold value Th in other pixels. In the thin line correcting process, a value obtained by adding the density peak degree to the pixel density of each pixel is used as a new pixel density. In the figure, the pixel density after thin line correction is represented by the dotted line. Accordingly, three pixels, that is, pixel 2, 3 and 4 come to have the densities higher than the threshold value Th.

Referring to FIG. 6(*b*), after thin line correction, pixel densities of four pixels, that is, pixels 2 to 5 are higher than the threshold value Th. Referring to FIG. 6(*c*), after thin line correction, pixels 2 to 11 come to have pixel densities higher than the threshold value Th. In this manner, by the thin line correction, the thin line of FIG. 6(*a*), of which pixel density of every pixel before processing has been lower than the threshold value Th, comes to have three pixels (pixels 2, 3 and 4) having pixel densities higher than the threshold value Th after processing. Thereby, the problem that the thin line becomes patchy after binarization can be solved.

In the thick lines of (*b*) and (*c*) of FIG. 6, pixels of which pixel density is higher than the threshold value Th is the same before and after the processing. This means that the problem that the thick line becomes thicker after binarization when the threshold value Th is lowered to the threshold value Th 1 to prevent the thin line from becoming patchy after binarization without the thin line correcting process can be solved. Consider threshold values Th and Th 1. Referring to FIG. 6(*b*), the number of pixels having higher pixel density than threshold value Th is four, that is, pixels 2 to 5, and the number of pixels having pixel density higher than Th 1 is six, from pixel 1 to pixel 6. Similarly, in FIG. 6(*c*), the number of pixels of which pixel density is higher than the threshold value Th is 11, that is, from pixel 2 to 11, and the number of pixels having the pixel density higher than Th 1 is 13, that is, pixels 1 to 13.

For simplicity of description, here, the value obtained by adding the density peak degree detected by the density peak detecting filter shown in FIG. 5A to the pixel density has been described as a new pixel density. In the thin line correcting process, maximum density peak degree among density peak degrees detected by four density peak detecting filters, that is, FIGS. 5A to 5D, is used as "degree of thinness", and a value obtained by adding the degree of thinness to the pixel density is used as a new pixel density.

Figure 4:
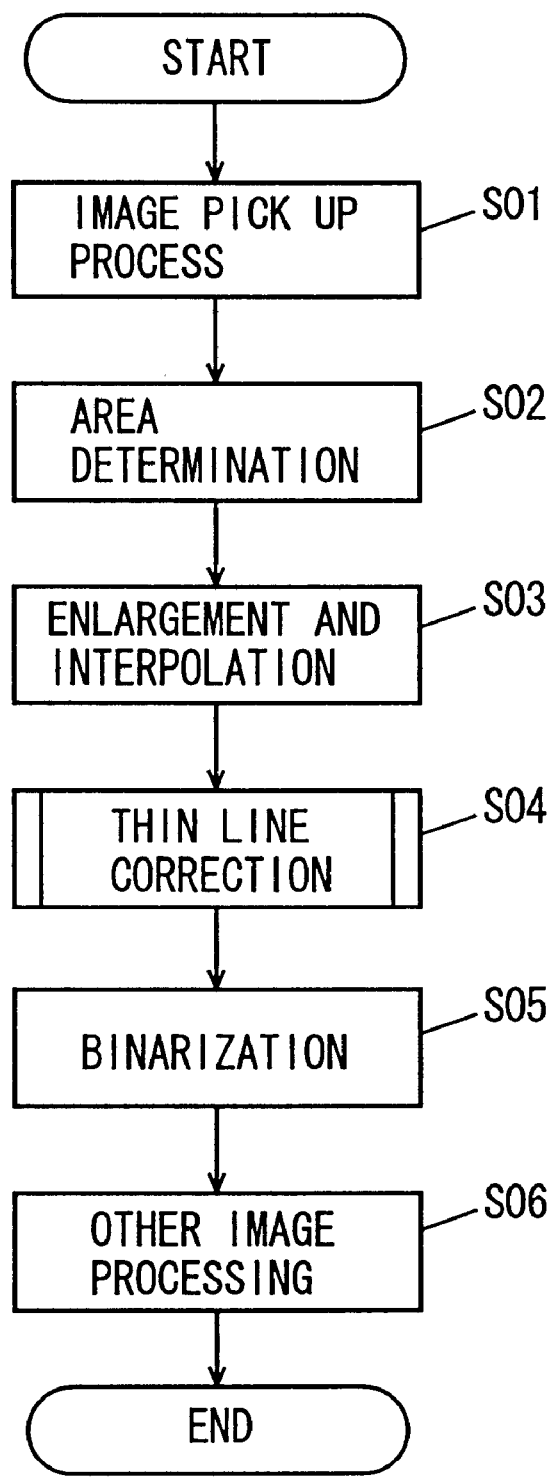
FIG. 4 is a flow chart representing the process flow of the image processing apparatus.
Figure 7:
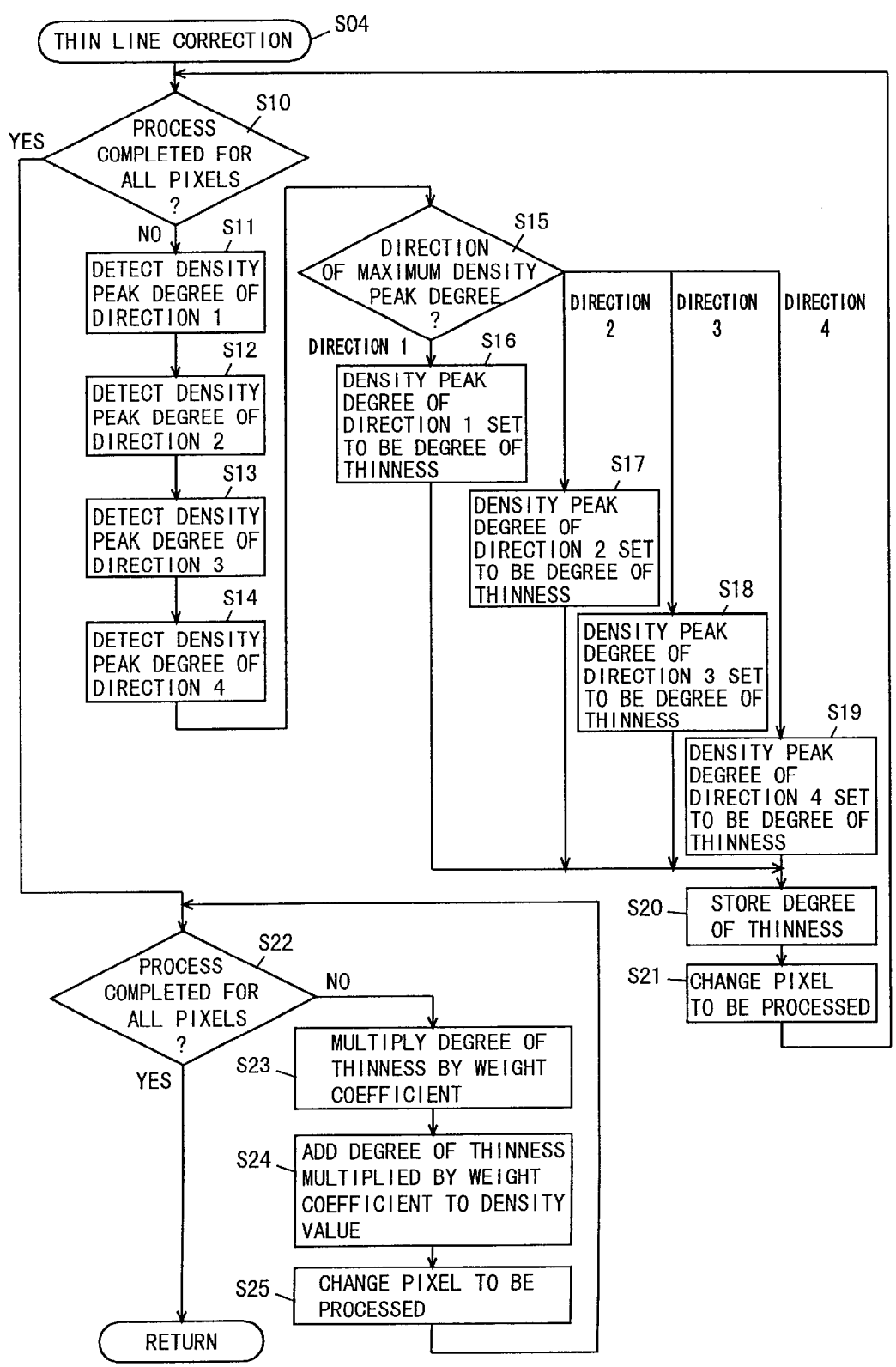
FIG. 7 is a flow chart representing process flow of thin line correcting process.

FIG. 7 is a flow chart representing the flow of thin line correcting process (step S04) of FIG. 4. Process of each step will be described in the following.

[step S10]

Among image data, pixel data in the area of character attribute are selected, and processes of steps S11 to S21 are performed pixel by pixel. When the processing is completed on all the pixels, the flow proceeds to step S22.

[steps S11 to step S14]

Density peak degrees are detected in a total of four directions, that is, lateral direction (direction 1), longitudinal direction (direction 2) and two diagonal directions (directions 3 and 4). Density peak detecting filters of respective directions shown in FIGS. 5A to 5D are used for detecting the density peak degrees. More specifically, density peak degrees in four directions are detected for each pixel.

[steps S15 to S19]

In step S15, among the density peak degrees detected in steps S11 to S14, the maximum density peak degree is selected (step S15), and the maximum density peak degree is regarded as the degree of thinness (steps S16 to SI9). The degree of thinness is used for pixel density correction in step S25.

The maximum value among the density peak degrees in four directions is used as the degree of thinness, in order to enable thin line correction of the thin line in any of longitudinal, lateral and two diagonal directions. Referring to FIG. 6(a), the maximum value of the density peak degree at the contour (pixels 1 and 5) of FIG. 6(a) is the value output from the density peak detecting filter in tangential direction (depth direction of the figure) with no variation in density, which is zero. Therefore, at the contour, the degree of thinness is zero, whereas the pixel density is not changed before and after the thin line correcting process. Near the center of the line (pixels 2 to 4), the output of density peak detecting filter in the lateral direction (direction 1) of FIG. 5A is positive, and therefore the degree of thinness has a positive value. Therefore, the pixel density after thin line correction becomes higher than before the correction. In this manner, when the maximum value of density peak degrees in four directions is used as the degree of thinness, it becomes possible to perform thin line correcting process on a thin line in any of the four directions.

In a small region totally surrounded by a line (for example, "□"), the maximum value of density peak degrees in the contour portion has a negative value. In this case, the thin line correcting process has an effect of reducing the contour portion. More specifically, a small region totally surrounded by a line inherently has high pixel density in the region surrounded by the line, and it is apt to be excessively dense. Therefore, by lowering pixel density of the area surrounded by the line, the thin line can be made thin and dense. Further, the area surrounded by the line will be white after binarization, and therefore the small region can be prevented from being smudged to solid black.

[steps S20, S21]

The degree of thinness is stored in image memory 24 (step S20), and the process proceeds to a pixel which is an object of the next determination of the degree of thinness (step S21).

[step S22]

Pixel data (which are subjected to the processes of steps S11 to S21) in the area of character attribute of image data are selected, and processes of steps S23 to S25 are performed pixel by pixel. When the processes are completed on every pixel, the thin line correcting process is terminated.

[steps S23]

The degree of thinness stored in step S20 is read, and a weight coefficient is multiplied. When the weight coefficient is increased, the influence of the density peak degree on the pixel density after thin line correction is increased, and when the weight coefficient is decreased, the influence will be smaller. In the present embodiment, the weight coefficient is "1".

[steps S24, S25]

The degree of thinness multiplied by the weight coefficient calculated in step S23 is added to the pixel density (step S24), and the result is used as the pixel density of the pixel to be processed (step S25).

Figure 8A:
FIGS. 8A to 8E are printed outputs of the image data after image processing.
Figure 8B:
Figure 8C:
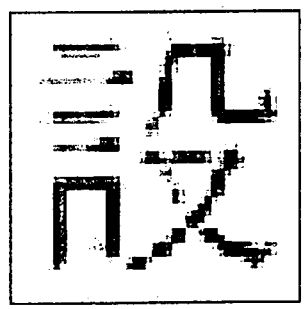
Figure 8D:
Figure 8E:

Referring to FIGS. 8A to 8E, the character "設", in MINCHO font, has lateral lines thinner than longitudinal and diagonal lines. FIG. 8A represents a double enlarged interpolated image. FIG. 8B is a binalized image of the double enlarged interpolated image. FIG. 8C represents an image when the degree of thinness is used as the pixel density of the image. FIG. 8D is an image (synthesized image) after thin line correction, and FIG. 8E is a binarized image thereof. The double enlarged interpolated image (FIG. 8A) and the image after thin line correction (8D) were binarized using the same threshold value. When FIGS. 8B and 8E are compared, it can be seen that the lateral thin line in FIG. 8B is partially missed, while in FIG. 8E, the lateral thin line is not patchy but clear. The thickness of the thick line (longitudinal line) is not much changed in FIG. 8E. Some variation occurs as the tangential direction of the line is not completely flat, so that the degree of thickness is not zero.

Though an example of character image has been described mainly in the present embodiment, it is apparent that similar effects can be attained on thin lines in graphs or drawings. Further, correction according to the present invention is not limited to enlargement interpolation, and degradation of images caused by defocus of optical system can also be corrected.

Though an image processing apparatus has been described in the present embodiment, the method of image processing represented by the flow charts of FIGS. 4 to 7 or a computer program product for performing the process represented by the flow charts of FIGS. 4 to 7 are also encompassed by the present invention, and can be implemented in the similar manner as the image processing apparatus. Similar effects as described with reference to the image processing apparatus can be attained by the method or the program product.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
   detecting means for detecting, for each of a plurality of pixel data constituting image data, based on densities of a process object pixel data to be processed and of peripheral pixel data positioned therearound, density peak degree of said process object pixel data; and
   correcting means for correcting, using the density peak degree detected by said detecting means, density of said process object pixel data, wherein said correcting means corrects the density of said process object pixel data, by adding said density peak degree to the density of said process object pixel data.

2. The image process apparatus according to claim 1, wherein said detecting means multiplies densities of said process object pixel data and said peripheral pixel data by a prescribed coefficient and summing the resulting values to detect the density peak degree of said process object pixel data.

3. The image process apparatus according to claim 1, wherein said detecting means detects the density peak degree direction by direction, based on densities of a plurality of said peripheral pixel data positioned in different directions with respect to said process object pixel data.

4. The image processing apparatus according to claim 3, wherein said detecting means selects maximum density peak degree among said detected density peak degrees of different directions as the density peak degree of said process object pixel data.

5. The image processing apparatus according to claim 1, wherein said correcting means multiplies said density peak degree by a prescribed weight coefficient, and adds the density peak degree multiplied by the weight coefficient to the density of said process object pixel data.

6. An image processing apparatus comprising:

detecting means for detecting, for each of a plurality of pixel data constituting image data, based on densities of a process object pixel data to be processed and of peripheral pixel data positioned therearound, density peak degree of said process object pixel data;

correcting means for correcting, using the density peak degree detected by said detecting means, density of said process object pixel data; and area determining means for extracting areas from said image data in accordance with attribute of said image data; wherein said detecting means detects density peak degree of pixel data belonging to an area of character attribute among areas extracted by said area determining means.

7. A method of image processing comprising:

a first step of detecting, for each of a plurality of pixel data constituting image data, based on densities of a process object pixel data to be processed and of peripheral pixel data positioned therearound, density peak degree of the process object pixel data; and a second step of correcting density of said process object pixel data, using the density peak degree detected in said first step, wherein in said second step, the density of said process object pixel data is corrected by adding said density peak degree to the density of said process object pixel data.

8. The method of image processing according to claim 7, wherein said first step, the density peak degree of said process object pixel data is detected by multiplying densities of said process object pixel data and said peripheral pixel data by a prescribed coefficient and summing the resulting values.

9. The method of image processing according to claim 7, wherein in said first step, the density peak degree is detected direction by direction, based on densities of a plurality of said peripheral pixel data positioned in different directions with respect to said process object pixel data.

10. The method of image processing according to claim 9, wherein in said second step, maximum density peak degree among said detected density peak degrees of different directions is selected as the density peak degree of said process object pixel data.

11. The method of image processing according to claim 7, wherein in said second step, said density peak degree is multiplied by a prescribed weight coefficient, and the density peak degree multiplied by the weight coefficient is added to the density of said process object pixel data.

12. A method of image processing comprising:

a first step of detecting, for each of a plurality of pixel data constituting image data, based on densities of a process object pixel data to be processed and of peripheral pixel data positioned therearound, density peak degree of the process object pixel data;

a second step of correcting density of said process object pixel data, using the density peak degree detected in said first step, and a third step of extracting areas from said image data in accordance with attribute of said image data; wherein in said first step, said density peak degree is detected for pixel data belonging to an area of character attribute among areas extracted in said third step.

13. A computer program product on a recording medium executable by a computer for processing an image, the computer program product comprising:

detecting means for detecting, for each of a plurality of pixel data constituting image data, based on densities of a process object pixel data to be processed and of peripheral pixel data positioned therearound, density peak degree of said process object pixel data; and correcting means for correcting density of said process object pixel data, using the density peak degree detected by said detecting means, wherein said correcting means corrects the density of said process object pixel data by adding said density peak degree to the density of said process object pixel data.

14. The computer program product according to claim 13, wherein said detecting means multiplies densities of said process object pixel data and said peripheral pixel data by a prescribed coefficient and summing the resulting values to detect the density peak degree of said process object pixel data.

15. The computer program product according to claim 13, wherein said detecting means detects the density peak degree direction by direction, based on densities of a plurality of peripheral pixel data positioned in different directions with respect to said process object pixel data.

16. The computer program product according to claim 15, wherein said detecting means selects maximum density peak degree among said detected density peak degrees of different directions, as the density peak degree of said process object pixel data.

17. The computer program product according to claim 13, wherein said correcting means multiplies said density peak degree by a prescribed weight coefficient, and adds the density peak degree multiplied by the weight coefficient to the density of said process object pixel data.

18. A computer program product on a recording medium executable by a computer for processing an image, the computer program product comprising:

detecting means for detecting, for each of a plurality of pixel data constituting image data, based on densities of a process object pixel data to be processed and of peripheral pixel data positioned therearound, density peak degree of said process object pixel data;

correcting means for correcting density of said process object pixel data, using the density peak degree detected by said detecting means; and area determining means for extracting areas from said image data in accordance with attribute of said image data; wherein said detecting means detects the density peak degree of pixel data belonging to an area of character attribute among areas extracted by said area determining means.

* * * * *